Patented Nov. 20, 1928.

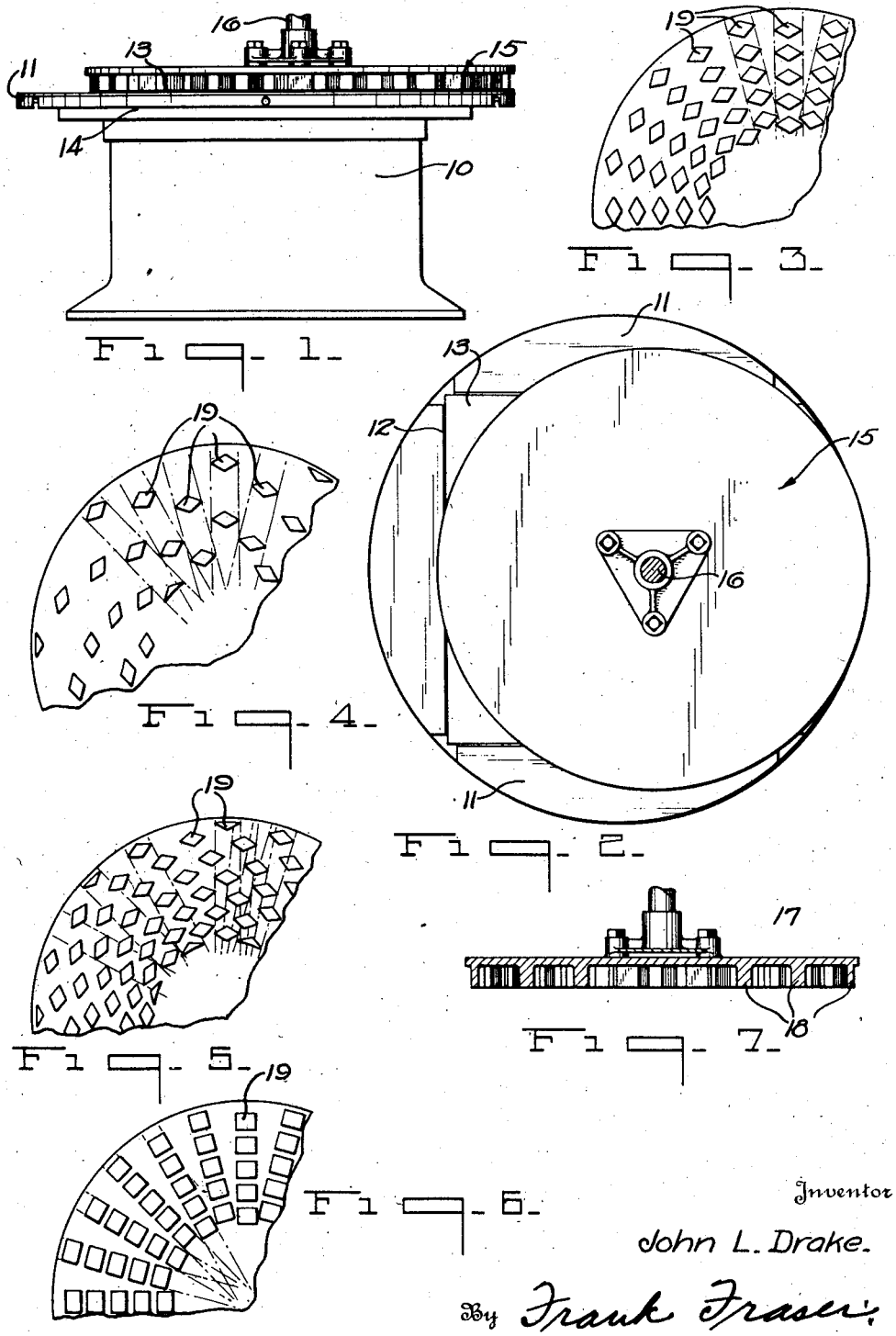

1,692,635

UNITED STATES PATENT OFFICE.

JOHN L. DRAKE, OF TOLEDO, OHIO, ASSIGNOR TO THE LIBBEY-OWENS SHEET GLASS COMPANY, OF TOLEDO, OHIO, A CORPORATION OF OHIO.

GRINDING HEAD.

Application filed April 1, 1926. Serial No. 98,949.

The present invention relates to sheet glass surfacing apparatus.

An important object of the invention is to provide an improved form of grinding head for use in the manufacture of plate glass.

Another object of the invention is to provide a grinding head including a plurality of projections arranged in rows.

A further object of the invention is to provide a grinding head for use in the manufacture of plate glass, the grinding head including a plate having a plurality of projections extending therefrom, the projections being so arranged that the area of the surface contacting with the sheet to be surfaced is substantially equal on all circumferences.

Another object of the invention is to provide a grinding wheel of this nature including a plurality of projections, the projections being arranged in rows along the radii of said grinding wheel.

Other objects and advantages of the invention will become apparent during the course of the following description.

In the drawings wherein like numerals are employed to designate like parts throughout the same, Fig. 1 is an elevation of a grinding machine shown diagrammatically, illustrating one form of my invention in use, Fig. 2 is a top plan view thereof, Figs. 3, 4, 5 and 6 are fragmentary views of various forms of the invention, and Fig. 7 is a vertical transverse section through one form thereof.

In the production of plate glass, a blank of glass is first ground and then polished. There are numerous methods of grinding and polishing the glass, and this invention is not limited to any one system. In Figs. 1 and 2 is shown diagrammatically one form of machine which may be used. The numeral 10 designates the grinding machine, including adjustable plates 11 arranged to form a recess 12 adapted to receive a sheet of glass 13 to be ground. In this particular type of machine the plates 11, carried by the table 14 and sheet of glass 13, are positively rotated. A grinding head 15, carried by the spindle 16, arranged in offset relation to the center of the table 14, is adapted to contact with the sheet of glass to be ground and to be rotated due to frictional contact therewith. The grinding head 15 usually comprises substantially a plate 17 having a plurality of projections 18 depending therefrom. The projections are ordinarily formed from some material such as cast iron. In operation, an abrasive such as sand, emery, garnet, or the like, is continuously supplied between the sheet of glass and the grinding head, the abrasive being suspended in water. Due to the offset relation of the axis of the grinding head with respect to the axis of the sheet of glass being surfaced, considerable relative movement takes place between the projections 18 and said sheet of glass, and because of the abrasive film between the two, the sheet 13 is ground down the desired amount. To facilitate a rapid grinding of the sheet and to permit a uniform grinding action, the present invention has to do with a definite location of the lugs or projections 18 on the grinding wheel.

Heretofore, it has been the main object to provide as many projections as possible on the grinding wheel with the idea in mind that the more projections there are the faster the sheet of glass is surfaced. It will be readily seen that, due to the fact that the grinding wheels 15 are disc-like, the number of projections on the wheel, and also their combined area, increases from the center toward the outer extremities. Other things being equal, the surfacing action on a sheet varies directly as the area of the surface passing across it. The surfacing action is thus greater where the more projections or the greater area contacts with the sheet, introducing a condition which is not uniform.

As is clearly shown in Figs. 3, 4, 5 and 6 of the drawings, the projections 19 are arranged radially from the center of the discs in rows so that lines drawn through the projections, as shown in the drawings, will be parallel. In Fig. 4, the rows are shown as being spirally arranged while in Fig. 5 the rows are staggered. Fig. 6 clearly shows the parallel relation of the lugs 19. It is to be understood that the shapes of the lugs 19 can be varied as desired. Due to the fact that the same amount of surface is presented by the lugs 19 from the innermost lugs to the outermost lugs, a uniform grinding action will be had on the sheet of glass being surfaced.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. A grinding head for use in the surfacing of flat glass comprising a circular plate carrying on one surface thereof a plurality of projections arranged radially from the center in rows and positioned and shaped in a manner that the entire area of the glass will be subjected to the action of equal areas of grinding head surface.

2. A grinding head for use in the surfacing of flat glass comprising a circular plate carrying on one surface thereof a plurality of projections arranged radially from the center in rows with the said rows being staggered to one another and positioned and shaped in a manner that the entire area of the glass will be subjected to the action of equal areas of grinding head surface.

3. A grinding head for use in the surfacing of flat glass comprising a circular plate carrying on one surface thereof a plurality of projections arranged in spiral rows and positioned and shaped in a manner that the entire area of the glass will be subjected to the action of equal areas of grinding head surface.

Signed at Toledo, in the county of Lucas and State of Ohio, this 30th day of March, 1926.

JOHN L. DRAKE.